United States Patent
Suzawa et al.

(10) Patent No.: US 6,858,279 B1
(45) Date of Patent: Feb. 22, 2005

(54) PROCESS FOR PRODUCING OPTICAL RECORDING MEDIUM AND OPTICAL RECORDING MEDIUM

(75) Inventors: Kazuki Suzawa, Komoro (JP); Hiroyuki Arioka, Nagano (JP); Tomoki Ushida, Saku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/551,537

(22) Filed: Apr. 18, 2000

(30) Foreign Application Priority Data

Apr. 22, 1999 (JP) ............................................ 11-114505

(51) Int. Cl.⁷ ............................ B29D 11/00; B32B 3/02; G03C 1/492; G11B 7/26
(52) U.S. Cl. .................... 428/64.2; 428/64.1; 428/64.4; 428/64.8; 428/913; 430/270.1; 430/273.14; 369/283; 369/288
(58) Field of Search ............................... 428/64.2, 64.4, 428/64.8, 64.1, 913; 430/270, 273.14; 156/275.3; 369/283, 288; 264/1.1

(56) References Cited

FOREIGN PATENT DOCUMENTS

| EP | 272933 | 6/1988 |
|----|--------|--------|
| EP | 356140 | 2/1990 |
| EP | 467716 | 1/1992 |
| EP | 718048 | 6/1996 |
| JP | 63159090 | 7/1988 |
| JP | 04369577 | 12/1992 |

*Primary Examiner*—Rena Dye
*Assistant Examiner*—Lawrence Ferguson
(74) *Attorney, Agent, or Firm*—David T. Nikaido

(57) ABSTRACT

The invention provides an optical recording medium having excellent weatherability and a process for producing the same. The optical recording medium is provided with an organic dye layer, a reflecting layer and a protective layer in this order on a light-transmittable substrate. The organic dye layer contains an organic solvent in an amount of 2% to 15% by weight based on the organic dye. A solution, prepared by dissolving an organic dye in an organic solvent, is applied onto the light-transmittable substrate by a spin coating method to form an organic dye layer. A reflecting layer is formed on the organic dye layer without performing a drying treatment of the organic solvent in the organic dye layer, followed by forming the protective layer on the reflecting layer. The result is an optical recording medium containing an organic solvent in an organic dye layer in an amount of 2% to 15% by weight based on an organic dye.

2 Claims, No Drawings

PROCESS FOR PRODUCING OPTICAL RECORDING MEDIUM AND OPTICAL RECORDING MEDIUM

BACKGROUND OF THE INVENTION

1. Field of the Invention

The present invention relates to a method for producing an optical recording medium having an organic dye layer and to an optical recording medium.

2. Description of the Related Art

That an organic dye such as a cyanine type, phthalocyanine type or azo type is used for recording layers of writable so-called recordable type optical recording media as represented by CD-R and DVD-R has been known.

In the formation of a recording layer which primarily contains an organic dye, generally such an organic dye as aforementioned is applied to a substrate by a spin coating method using an organic solvent such as cyclohexane, cyclohexanone, methanol, ethanol, isopropyl alcohol, diacetone alcohol, methyl cellosolve, ethyl cellosolve, butyl acetate or fluorinated alcohols singly or as a mixture. Then a reflecting layer is formed on the formed recording layer.

Meanwhile, it is demanded of optical recording media to have weatherability taking various working conditions into consideration. It is assumed to be desirable that a solvent is contained in a recording layer in a smaller amount to improve this weatherability. So a process is generally used in which an organic dye is dissolved in a suitable solvent to form an organic dye layer by a spin coating method and thereafter the residual solvent in the organic dye layer is dried in a proper drying step using high temperature drying, vacuum drying, air blast drying or the like, followed by forming a reflecting layer on the organic dye layer.

For example, Japanese Examined Patent Publication No. 7-96333 discloses a process in which a dye is dissolved in a solvent containing a fluorinated alcohol to prepare an coating solution and thereafter the coating solution is applied to a substrate and dried to form a recording layer.

For example, Japanese Laid-open Patent Application No. 4-369577 discloses a process in which the amount of a solvent in a recording layer is decreased by carrying out intentional drying after the recording layer is formed, to thereby make a reflecting layer when the amount of the solvent contained in the applied recording layer is 10% by weight or less based on the recording layer.

However, the drying step after the recording layer is formed has the drawback that it requires a long period of time to dry a solvent sufficiently. Such a drying step is unacceptable from the productional point of view. It is difficult to adopt such a way that the drying temperature is raised to avoid such a drying step requiring long time if its influence on the applied organic dye, on the resin used for a substrate or on the mechanical accuracy of a substrate is taken into account.

Also, in Japanese Laid-open Patent Application No. 4-369577, the amount of a solvent in a recording layer of the resulting optical recording medium is nowhere considered though the amount of a solvent in the recording layer when the reflecting layer is formed is considered.

SUMMARY OF THE INVENTION

It is an object of the present invention to provide an optical recording medium having excellent weatherability. A further object of the present invention is to provide a method for producing the optical recording medium having excellent weatherability in an efficient manner.

In light of this situation, the present inventors have made studies repeatedly to improve the aforementioned problem and, as a result, found that an optical recording medium having high weatherability can be produced even when no drying step is performed after an organic dye layer is formed by a spin coating method. The inventors have also ascertained the fact that a specific solvent remains involved in an organic dye layer of the optical recording medium obtained in this manner.

The inventors have made further studies to find that it is of importance to define the type of solvent and the relative weight of the solvent to the weight of a dye in the dye layer. As a consequence, excellent weatherability can be exhibited by an optical recording medium comprising an organic dye layer containing an organic solvent, e.g., a fluorinated alcohol having a boiling point of 60° C. or more (e.g., 2,2,3,3-tetrafluoro-1-propanol) or diacetone alcohol or 2-ethoxyethanol, which is used when a dye is applied, with the proportion of the organic solvent being 2 to 15% by weight and preferably 2.2 to 14.5% by weight based on the weight of the organic dye.

The present invention relates to a process for producing an optical recording medium containing an organic solvent in an organic dye layer in an amount of 2 to 15% by weight based on an organic dye, the process comprising applying a solution, prepared by dissolving the organic dye in the organic solvent, onto a light-transmittable substrate by a spin coating method to form the organic dye layer, thereafter forming a reflecting layer on the organic dye layer without performing a drying treatment of the organic solvent left in the organic dye layer and further forming a protective layer on the reflecting layer.

In the process, preferably the spin coating is performed at a rotating speed of 3500 rpm or more in the formation of the organic dye layer.

The present invention relates to an optical recording medium having an organic dye layer, a reflecting layer and a protective layer in this order on a light-transmittable substrate, the optical recording medium containing an organic solvent in the organic dye layer in an amount of 2 to 15% by weight based on an organic dye.

In the optical recording medium of the present invention, preferably the organic solvent is at least one member selected from fluorinated alcohols having a boiling point of 60° C. or more, 2-ethoxyethanol and diacetone alcohol. Preferably also the organic solvent is mainly 2,2,3,3-tetrafluoro-1-propanol.

According to the present invention, an organic solvent is contained in the organic dye layer in an amount of 2 to 15% by weight based on an organic dye, whereby an optical recording medium which is superior in electric properties and reliability can be obtained. According to the process of the present invention, such an optical recording medium can be obtained and it is unnecessary to perform any drying step after the organic dye layer is formed, which simplifies a production process and brings about an effect of remarkably decreasing production time.

DETAILED DESCRIPTION OF THE INVENTION

The structure of the optical recording medium of the present invention is fundamentally the same as those of current Recordable type optical recording media. In the structure, an organic dye recording layer which serves to record and reproduce using laser light is formed on a light-transmittable substrate formed with a pregroove, a reflecting layer increasing light-reflectance is formed on the organic dye recording layer and further a protective layer which protects the organic dye recording layer and the reflecting layer is formed on the reflecting layer.

An optical recording medium obtained by using the optical recording medium having such a layer structure as at least one party and by laminating it to the other through an adhesive layer is also included in the present invention. Alternatively, an optical recording medium in which the adhesive layer doubles as a protective layer on the reflective layer is also included in the present invention. Further, in order to arise the scuff resistance of the light-transmittable substrate, an organic protective layer may be formed on the opposite surface of the substrate with respect to the organic dye layer.

As materials of the light-transmittable substrate, for example, a polymer material typified by a polycarbonate resin, acrylic resin, polystyrene resin, epoxy resin, polyester resin, vinyl chloride resin or polyolefin resin or an inorganic material such as glass may be used. A pregroove of stamper is transferred by primarily injection molding in the case of using a resin material and by primarily a 2P method in the case of using glass, thereby preparing the substrate.

Then, the organic dye layer including an organic dye as its major component is formed on the substrate.

The organic dye layer may be any one of those which can read a variation, in shape or optical properties, which is made due to a physical and/or chemical change caused by the absorption of recording laser light, by using reproducing laser light. For the formation of a locally denatured portion, for instance, a phthalocyanine dye, cyanine dye or azo dye which has an absorption area in the wavelength range of a semiconductor laser is used very often. These dyes may be used either singly or in combinations of two or more, to which a singlet oxygen quencher, a UV-ray absorber or the like may be added as required. It is also preferable to use an ionic bonding material of a dye cation and an anion of singlet oxygen quencher as the organic dye.

In the present invention, a coating solution is prepared by dissolving an organic dye in an organic solvent and the coating solution is applied onto the substrate by a spin coating method to form the organic dye layer. It is desirable to control the concentration of an organic dye component in the coating solution and the thickness of the organic dye layer to be formed so that sufficient reflectance can be obtained after the reflecting layer is formed.

As the organic solvent used for the preparation of the coating solution, a fluorinated alcohol, especially 2,2,3,3-tetrafluoro-1-propanol, having a boiling point of 60° C. or more, 2-ethoxyethanol or diacetone alcohol is preferable, although it differs depending upon the dye and material of the light-transmittable substrate to be used. These solvents may be used either singly or in combinations of two or more. The fluorinated alcohol having a boiling point less than 60° C. is dried sufficiently in usual high temperature and high humidity conditions used in a conventional step of applying an organic dye, but makes it impossible to apply an organic dye uniformly because of its high drying rate.

Also, other solvents except for the above solvents may be mixed corresponding to the requirements. As the other solvents to be mixed, it is necessary to select those which not only dissolve an organic dye but also give no damage to the light-transmittable substrate.

The rotating speed of a spin coating is preferably 3500 rpm ormore, for instance 3500 rpm to 5000 rpm, andmore preferably 4000 rpm to 5000 rpm, for instance 4500 rpm to 5000 rpm. Such a high rotating makes it possible to remove a solvent in an efficient manner. This rotating speed is the final rotating speed of the spin coating. For instance, the rotating speed may be designed to be about 300 rpm to 500 rpm in the first stage when the coating solution is dripped on the substrate, then gradually increased and finally 3500 rpm or more.

After the spin coating is finished, the reflecting layer is formed on the organic dye layer by a sputtering method without carrying out a drying process though an organic solvent remains unremoved in the formed organic dye layer. The reflecting layer is formed directly on the organic dye layer. The thickness of the reflecting layer is, for example, about 10 to 500 nm. The reflecting layer comprises a single metal or a metal component containing other metals. The reflecting layer is formed using an elemental component, e.g., Au, Ag, Al, Cu, Cr, Ni, Si or Ge either singly or including other elements by a sputtering method. A large part of the residual organic solvent left in the organic dye layer is removed in the sputtering step. Conventionally, high temperature drying, vacuum drying or air blast drying is performed after an organic dye layer is applied. On the other hand, such a drying step is not required in the present invention. By the omission of the drying step, production time can be greatly shortened.

A protective layer with a thickness of, for example, 1 to 50 $\mu$m is formed on the reflecting layer. Layers which can protect the organic dye recording layer and the reflecting layer suffice for the protective layer, and there is no particular limitation to the structural material of the protective layer. As the material of the protective layer, a UV-ray curable type acrylic resin is usually used from, for example, the reason that the protective layer can be formed with ease. The material of the protective layer may also be an organic material such as a vinyl chloride resin, epoxy resin or polyester resin or an inorganic material such as $SiO_2$ or AlN. These materials may be either singly or as a mixture. The protective layer may comprise multiple layers in which different materials are laminated.

On the protective layer, a label printing layer may be further formed.

Moreover, when such an optical recording medium is laminated with an adhesive layer being provided on the side opposite to a plane of incidence of light, the adhesive layer may double as the protective layer.

Preferably the protective layer is formed by a spin coating method in order to avoid damages to the reflecting layer. However, the protective layer may be formed by a screen printing method, dipping method or spray coating method etc.

The optical recording medium of the present invention has an organic dye layer containing an organic solvent in an amount of 2 to 15% by weight based on an organic dye included in the organic dye layer. If the content of the organic solvent falls in the above range, an optical recording medium having practically sufficient weatherability can be obtained. If the amount of the organic solvent is increased, the weatherability tends to be impaired. To state in more detail, if the content of the organic solvent exceeds 15% by weight, a problem concerning the weatherability of the optical recording medium will arise. On the other hand, the production of a medium containing an organic solvent in an amount less than 2% by weight needs high temperature drying requiring long time, which is disadvantageous in the production process. While, severe drying in a short time causes failures of the organic dye and the substrate. An optical recording medium having with an organic dye layer in which the content of an organic solvent therein is 2.2 to 14.5% by weight based on an organic dye has excellent weatherability. A more preferable content of the organic solvent is, for example, 2.3 to 10% by weight and a still more preferable content of the organic solvent is, for example, 2.5 to 5% by weight when the production efficiency is taken into account.

EXAMPLES

Next, the present invention will be explained in more detail by way of examples, which are not intended to be limiting of the present invention.

Example 1

As an organic dye, a mixture dye consisting of a cyanine dye NK3721 (manufactured by Hayashibara Biochemical Laboratories, Inc.) and a cyanine dye OM-57 (manufactured by Fuji Photo Film Co., LTD.) in a ratio (by weight) of 6:4 was used.

2 g of the above cyanine mixture dye was dissolved in 100 g of 2,2,3,3-tetrafluoro-1-propanol (TFP) to prepare a coating solution. The coating solution was applied onto a polycarbonate substrate with a diameter of 120 mm and a thickness of 1.2 mm having pregroove, produced by injection molding, by a spin coating method. In the spin coating, the rotating speed was set to 300 rpm when the coating solution was dripped on the substrate, gradually increased and finally set to 5000 rpm. An Ag layer with a thickness of 100 nm was formed on the dye layer by a sputtering method immediately after the coating without carrying out drying. Further, a UV-ray curable acrylic resin DAICURE CLEAR SD318 (manufactured by Dainippon Ink and Chemicals, Inc.) was applied onto the Ag layer by a spin coating method to form a protective layer with a thickness of 5 $\mu$m. Thus 100 optical recording media according to the present invention were made. The thickness of the organic dye layer was about 250 nm at the groove portion and about 150 nm at the land portion. The adhesion between the organic dye layer and the reflecting layer was good.

Recordings were made in the resulting 10 optical recording media among the resulting 100 recording media by using a commercially available CD-R drive and the optical recording media were then subjected to a weatherability test performed in a thermo-hygrostat kept at a temperature of 80° C. and a humidity of 80% for 200 hours. Each characteristic (jitter value) before and after the weatherability test was measured and evaluated using a CD-CATS-SA3 manufactured by Audio Development. As a consequence, with regard to all media, the same initial (before the weatherability test) characteristic as that of a current CD-R was obtained and this characteristic was not deteriorated even after the weatherability test. Each jitter value before and after the weatherability test is shown in Table 1. In Table 1, each jitter value is an average of the measured values of 10 samples and the measured position is set at a radius of the center of the medium.

With regard to 90 optical recording media among the resulting 100 optical recording media, the organic dye layer in the medium was washed away with ethanol and the resulting liquid was dried at room temperature. The amount of a residual solvent in the resulting dye was measured using gas chromatography and, as a result, a residual solvent was detected in an amount of 4.69% by weight based on the weight of the dye contained in the optical recording medium.

The residual solvent was a fluorinated alcohol mainly including 2,2,3,3-tetrafluoro-1-propanol. Ethanol was smaller than its detection limit.

Example 2

The same procedures as in Example 1 were carried out, except that an coating solution prepared by dissolving 2 g of the same cyanine dye that was used in Example 1, in 100 g of diacetone alcohol was used, to produce 100 optical recording media.

The characteristic of the optical recording medium was measured and evaluated in the same manner as in Example 1 and as a result, with regard to all media, the same initial characteristic as that of a current CD-R was obtained and this characteristic was not deteriorated even after the weatherability test.

The amount of a residual solvent on the basis of the weight of the dye contained in the optical recording medium was measured in the same manner as in Example 1 and as a result, 2.9% by weight of diacetone alcohol was detected. Ethanol was smaller than its detection limit.

Example 3

The same procedures as in Example 1 were carried out, except that an coating solution prepared by dissolving 2 g of the same cyanine dye that was used in Example 1, in 100 g of 2-ethoxyethanol was used, to produce 100 optical recording media.

The characteristic of the optical recording medium was measured and evaluated in the same manner as in Example 1 and as a result, with regard to all media, the same initial characteristic as that of a current CD-R was obtained and this characteristic was not deteriorated even after the weatherability test.

The amount of a residual solvent on the basis of the weight of the dye contained in the optical recording medium was measured in the same manner as in Example 1 and as a result, 2.3% by weight of 2-ethoxyethanol was detected. Ethanol was smaller than its detection limit.

Comparative Example 1

The same procedures as in Example 1 were carried out using the same coating solution that was used in Example 1, except that the rotating speed was set to 300 rpm when the coating solution was dripped on the substrate, gradually increased and finally set to 3000 rpm to perform spin coating, to produce 100 optical recording media.

The characteristic of the optical recording medium was measured and evaluated as in Example 1 and as a result, the optical recording medium was inferior in initial characteristic to a current CD-R and the characteristic was more deteriorated after the weatherability test.

The amount of a residual solvent on the basis of the weight of the dye contained in the optical recording medium was measured in the same manner as in Example 1 and as a result, 16% by weight of a residual solvent was detected. The residual solvent was a fluorinated alcohol primarily including 2,2,3,3-tetrafluoro-1-propanol. Ethanol was smaller than its detection limit.

Comparative Example 2

The same procedures as in Example 2 were carried out using the same coating solution that was used in Example 2, except that the rotating speed was set to 300 rpm when the coating solution was dripped on the substrate, gradually increased and finally set to 3000 rpm to perform spin coating, to produce 100 optical recording media.

The characteristic of the optical recording medium was measured and evaluated as in Example 1 and as a result, the optical recording medium was inferior in initial characteristic to a current CD-R and the characteristic was more deteriorated after the weatherability test.

The amount of a residual solvent on the basis of the weight of the dye contained in the optical recording medium was measured in the same manner as in Example 1 and as a result, 17% by weight of diacetone alcohol was detected. Ethanol was smaller than its detection limit.

Comparative Example 3

The same procedures as in Example 3 were carried out using the same coating solution that was used in Example 3, except that the rotating speed was set to 300 rpm when the coating solution was dripped on the substrate, gradually increased and finally set to 3000 rpm to perform spin coating, to produce 100 optical recording media.

The characteristic of the optical recording medium was measured and evaluated as in Example 1 and as a result, the Thus 100 optical recording media were made. The thickness of the organic dye layer was about 250 nm at the groove portion and about 150 nm at the land portion.

The characteristic of the optical recording medium was measured and evaluated in the same manner as in Example 1 and as a result, with regard to all media, the same initial characteristic as that of a current CD-R was obtained and this characteristic was not deteriorated even after the weatherability test.

The amount of a residual solvent on the basis of the weight of the dye contained in the optical recording medium was measured in the same manner as in Example 1 and as a result, found to be less than 2% by weight. Ethanol was smaller than its detection limit.

However, when this medium is produced, drying time as long as 12 hours is required, imposing a more considerable time burden than in the present invention.

As this invention may be embodied in several forms without departing from the spirit of essential characteristics thereof, the foregoing embodiments are therefore merely illustrative and should not be interpreted as restrictive, and all changes that fall within equivalence of claims are therefore intended to be embraced by the claims.

TABLE 1

| | | Jitter Values | | | | | | |
|---|---|---|---|---|---|---|---|---|
| | Measuring Position | Example 1 | Example 2 | Example 3 | Comparative Example 1 | Comparative Example 2 | Comparative Example 3 | Comparative Example 4 |
| Before Weatherability Test | Radius 25 mm | 7.84 | 7.82 | 7.86 | 8.46 | 8.51 | 8.48 | 7.86 |
| | Radius 40 mm | 7.85 | 7.85 | 7.88 | 8.53 | 8.54 | 8.50 | 7.90 |
| | Radius 55 mm | 7.89 | 7.88 | 7.90 | 8.60 | 8.71 | 8.67 | 7.94 |
| After Weatherability Test | Radius 25 mm | 8.86 | 8.82 | 8.91 | 11.54 | 11.68 | 11.57 | 9.02 |
| | Radius 40 mm | 8.92 | 8.86 | 8.93 | 11.58 | 11.72 | 11.63 | 9.20 |
| | Radius 55 mm | 8.89 | 8.91 | 8.97 | 11.71 | 11.89 | 11.80 | 9.26 | optical recording medium was inferior in initial characteristic to a current CD-R and the characteristic was more deteriorated after the weatherability test.

The amount of a residual solvent on the basis of the weight of the dye contained in the optical recording medium was measured in the same manner as in Example 1 and as a result, 16% by weight of 2-ethoxyethanol was detected. Ethanol was smaller than its detection limit.

Comparative Example 4

The same coating solution that was used in Example 1 was applied onto a polycarbonate substrate with a diameter of 120 mm and a thickness of 1.2 mm having pregroove, produced by injection molding, by a spin coating method. In the spin coating, the rotating speed was set to 300 rpm when the coating solution was dripped on the substrate, gradually increased and finally set to 1200 rpm. After the coating was finished, the substrate was dried in a thermostat kept at 60° C. for 12 hours. After the drying, an Ag layer with a thickness of 100 nm was formed on the dye layer by a sputtering method. Further, a DAICURE CLEAR SD318 was further applied onto the Ag layer by a spin coating method to form a protective layer with a thickness of 5 μm.

What is claimed is:

1. A process for producing an optical recording medium containing an organic solvent in an organic dye layer in an amount of 2 to 15% by weight based on an organic dye, wherein the content of the organic dye is 87.0 to 98.0% by weight based on the total amount of the organic dye and the organic solvent in the organic dye layer, the process comprising applying a solution, prepared by dissolving the organic dye in the organic solvent, onto a light-transmittable substrate by a spin coating method to form the organic dye layer, thereafter forming a reflecting layer on the organic dye layer without performing a drying treatment of the organic solvent left in the organic dye layer and further forming a protective layer on the reflecting layer, wherein the spin coating is performed at a rotating speed of 3500 rpm or more in the formation of the organic dye layer, and wherein said organic solvent is at least one member selected from the group consisting of 2,2,3,3-tetrafluoro-1-propanol, 2-ethoxyethanol and diacetone alcohol.

2. An optical recording medium having an organic dye layer, a reflecting layer and a protective layer in this order on a light-transmittable substrate, the optical recording medium containing an organic solvent in the organic dye layer in an amount of 2 to 15% by weight based on an organic dye, wherein the content of the organic dye is 87.0 to 98.0% by weight based on the total amount of the organic dye and the organic solvent in the organic dye layer, and wherein said organic solvent is at least one member selected from the group consisting of 2,2,3,3-tetrafluoro-1-propanol, 2-ethoxyethanol and diacetone alcohol.

* * * * *